(12) United States Patent
Jakupi (10) Patent No.: US 10,848,198 B1
(45) Date of Patent: Nov. 24, 2020

(54) SPECTRAL REDUCTION ON AC CURRENT AND VOLTAGE IN COMMUNICATING CIRCUIT BREAKERS

(71) Applicant: Schneider Electric USA, Inc., Boston, MA (US)

(72) Inventor: Andi Jakupi, Marion, IA (US)

(73) Assignee: Schneider Electric USA, Inc., Boston, MA (US)

( * ) Notice: Subject to any disclaimer, the term of this patent is extended or adjusted under 35 U.S.C. 154(b) by 0 days.

(21) Appl. No.: 16/548,796

(22) Filed: Aug. 22, 2019

(51) Int. Cl.
*H02H 1/00* (2006.01)
*H04B 1/66* (2006.01)
*H02H 3/16* (2006.01)

(52) U.S. Cl.
CPC ............. *H04B 1/66* (2013.01); *H02H 1/0061* (2013.01); *H02H 3/167* (2013.01)

(58) Field of Classification Search
CPC .... H02H 1/0061; H02H 3/167; H02H 1/0092; H02H 7/263; H03M 7/30; G06F 17/147
See application file for complete search history.

(56) References Cited

U.S. PATENT DOCUMENTS

| | | | | |
|---|---|---|---|---|
| 8,350,417 B1* | 1/2013 | Dooley | ................ | G01R 21/133 307/140 |
| 9,685,992 B2* | 6/2017 | Bennett | .................... | H04B 3/54 |
| 2009/0171603 A1* | 7/2009 | Changali | .............. | H02H 1/0015 702/66 |
| 2013/0063205 A1* | 3/2013 | Ohnari | ................. | H02H 1/0092 327/551 |
| 2014/0164294 A1* | 6/2014 | Osann, Jr. | .............. | G06Q 10/00 705/412 |
| 2016/0178674 A1* | 6/2016 | Mollier | ................ | G01R 19/252 702/65 |
| 2017/0103626 A1 | 4/2017 | Reid | | |
| 2019/0324075 A1* | 10/2019 | Kinsella | .................. | H01F 38/30 |
| 2020/0052482 A1* | 2/2020 | Ostrovsky | ................ | H04Q 9/00 |

OTHER PUBLICATIONS

Christoph Loeffler, Adriaan Ligtenberg, and George S. Moschytz; "Practical Fast 1-D DCT Algorithms With 11 Multiplications"; pp. 988-991.

* cited by examiner

*Primary Examiner* — Sophia Vlahos
(74) *Attorney, Agent, or Firm* — Locke Lord LLP (57) ABSTRACT

A circuit interrupt device provides a controller and method thereof that is programmed to receive a plurality of data sequences, each data sequence containing a set of data points corresponding to a waveform of line current flowing through the circuit interrupt device. The controller performs spectral reduction on the plurality of data sequences using a finite series transform to reduce bandwidth requirement and transmits a spectrally reduced version of the plurality of data sequences to an external system using reduced bandwidth. The data can then be processed and converted to meta data for monitoring and tracking purposes.

20 Claims, 8 Drawing Sheets

SPECTRAL REDUCTION ON AC CURRENT AND VOLTAGE IN COMMUNICATING CIRCUIT BREAKERS

TECHNICAL FIELD

The present disclosure relates to electronic circuit breakers and more particularly to communicating large quantities of information regarding operational aspects of an electronic circuit breaker in real time by using spectral reduction to reduce a required bandwidth.

BACKGROUND

Modern electronic circuit breakers and other circuit interrupt devices have a controller and other electronic components that offer a number of functions not otherwise available in older, purely thermomechanical breakers. The controller provides electronic circuit breakers the ability to detect and distinguish between for example ground faults, which are conductive paths formed between an ungrounded current carrying conductor and earth ground, and arc faults, which are intermittent faults that can be caused by worn or damaged insulation, loose connections, broken conductors, and the like. The circuit breakers can detect such faults by using the controller to constantly obtain samples of line current and/or voltage and monitoring the samples to determine whether the current/voltage exceeds a predefined threshold.

The above electronic circuit breakers can be installed in both residential and commercial settings. Each circuit breaker protects a particular circuit in a house or building against overcurrent and short-circuit current. The circuit protected by a breaker is usually referred to as a branch circuit. The breakers are most often mounted within slots in one or more panelboards, one breaker per slot. The one or more panelboards serve as a load center to distribute electricity from an AC main throughout the house or building. The load centers are most often located in a low-traffic area, such as the garage or basement in a house or a utility closet in a building.

While a number of advances have been made in the field of electronic circuit breakers, it will be readily appreciated that improvements are continually needed.

SUMMARY

The present disclosure relates to circuit interrupt devices having a controller and method thereof that is programmed to receive a plurality of data sequences, each data sequence containing a set of data points corresponding to a waveform of line current flowing through the circuit interrupt device. The controller performs spectral reduction on the plurality of data sequences using a finite series transform to reduce bandwidth requirement and transmits a spectrally reduced version of the plurality of data sequences to an external system using reduced bandwidth. The data can then be processed and converted to meta data for monitoring and tracking purposes.

In general, in one aspect, the present disclosure relates to a method of communicating high-resolution information from a circuit interrupt device to an external system. The method comprises, among other things, receiving a plurality of data sequences at a controller of the circuit interrupt device, each data sequence containing a set of data points corresponding to a waveform of line current flowing through the circuit interrupt device. The method further comprises performing spectral reduction on the plurality of data sequences using a finite series transform at the controller, and transmitting a spectrally reduced version of the plurality of data sequences to the external system.

In accordance with one or more embodiments, spectral reduction is performed on the plurality of data sequences by performing a first transform using the finite series transform on each data sequence in the plurality of data sequences at the controller to produce a plurality of waveform vectors, each waveform vector corresponding to a respective data sequence and containing a set of first spectral coefficients, each coefficient in the set of first spectral coefficients corresponding a data point in the respective data sequence, and reducing each waveform vector in the plurality of waveform vectors at the controller to produce a plurality of spectrally significant waveform vectors, each spectrally significant waveform vector corresponding to a respective waveform vector and containing only spectrally significant first spectral coefficients from the respective waveform vector.

In accordance with one or more embodiments, spectral reduction is performed on the plurality of data sequences by performing a second transform using the finite series transform on each spectrally significant waveform vector in the plurality of spectrally significant waveform vectors at the controller to produce a plurality of packet vectors, each packet vector containing a set of second spectral coefficients, each coefficient in the set of second spectral coefficients corresponding to a spectrally significant first spectral coefficient from a different spectrally significant waveform vector in the plurality of spectrally significant waveform vectors, and reducing each packet vector in the plurality of packet vectors at the controller to produce a plurality of spectrally significant packet vectors, each spectrally significant packet vector corresponding to a respective packet vector and containing only spectrally significant second spectral coefficients from the respective packet vector.

In accordance with one or more embodiments, reducing each waveform vector in the plurality of waveform vectors at the controller to produce a plurality of spectrally significant waveform vectors comprises determining an optimal number of spectrally significant first spectral coefficients from the set of first spectral coefficients in each waveform vector. In accordance with one or more embodiments, reducing each packet vector in the plurality of packet vectors at the controller to produce a plurality of spectrally significant packet vectors comprises determining an optimal number of spectrally significant second spectral coefficients from the set of second spectral coefficients in a packet vector.

In accordance with one or more embodiments, determining an optimal number of spectrally significant waveform vectors at the controller comprises determining whether a spectral ratio comprising a Euclidean distance for the optimal number of spectrally significant first spectral coefficients over a Euclidean distance for the set of first spectral coefficients in each waveform vector satisfies a Quality of Service (QoS) requirements. In accordance with one or more embodiments, determining an optimal number of spectrally significant second spectral coefficients comprises determining whether a spectral ratio comprising a Euclidean distance for the optimal number of spectrally significant second spectral coefficients over a Euclidean distance for the set of second spectral coefficients in each waveform vectors satisfies a Quality of Service (QoS) requirements, the spectral ratio.

In accordance with one or more embodiments, the plurality of spectrally significant packet vectors is inserted into a data packet, the finite series transform is a Discrete Cosine Transform, and/or the plurality of data sequences is transmitted over a wireless connection.

In general, in another aspect, the present disclosure relates to a circuit interrupt device comprising, among other things, a controller programmed to detect a fault condition in a branch circuit connected to the circuit interrupt device, and a trip unit coupled to communicate with the controller and operable to shut off current flow through the circuit interrupt device in response to receiving a trip signal from the controller. The controller is further programmed to receive a plurality of data sequences, each data sequence containing a set of data points corresponding to a waveform of line current flowing through the circuit interrupt device, perform spectral reduction on the plurality of data sequences using a finite series transform, and transmit a spectrally reduced version of the plurality of data sequences to an external system.

In accordance with one or more embodiments, the controller is further programmed to perform a first transform using the finite series transform on each data sequence in the plurality of data sequences at the controller to produce a plurality of waveform vectors, each waveform vector corresponding to a respective data sequence and containing a set of first spectral coefficients, each coefficient in the set of first spectral coefficients corresponding a data point in the respective data sequence, and reduce each waveform vector in the plurality of waveform vectors at the controller to produce a plurality of spectrally significant waveform vectors, each spectrally significant waveform vector corresponding to a respective waveform vector and containing only spectrally significant first spectral coefficients from the respective waveform vector.

In accordance with one or more embodiments, the controller is further programmed to perform a second transform using the finite series transform on each spectrally significant waveform vector in the plurality of spectrally significant waveform vectors at the controller to produce a plurality of packet vectors, each packet vector containing a set of second spectral coefficients, each coefficient in the set of second spectral coefficients corresponding to a spectrally significant first spectral coefficient from a different spectrally significant waveform vector in the plurality of spectrally significant waveform vectors, and reduce each packet vector in the plurality of packet vectors at the controller to produce a plurality of spectrally significant packet vectors, each spectrally significant packet vector corresponding to a respective packet vector and containing only spectrally significant second spectral coefficients from the respective packet vector.

In accordance with one or more embodiments, the controller is further programmed to reduce each waveform vector in the plurality of waveform vectors to produce a plurality of spectrally significant waveform vectors by determining an optimal number of spectrally significant first spectral coefficients from the set of first spectral coefficients in each waveform vector. In accordance with one or more embodiments, the controller is further programmed to reduce each packet vector in the plurality of packet vectors to produce a plurality of spectrally significant packet vectors by determining an optimal number of spectrally significant second spectral coefficients from the set of second spectral coefficients in a packet vector.

In accordance with one or more embodiments, the controller is further programmed to determine an optimal number of spectrally significant waveform vectors by determining whether a spectral ratio comprising a Euclidean distance for the optimal number of spectrally significant first spectral coefficients over a Euclidean distance for the set of first spectral coefficients in each waveform vector satisfies a Quality of Service (QoS) requirements. In accordance with one or more embodiments, the controller is further programmed to determine an optimal number of spectrally significant second spectral coefficients by determining whether a spectral ratio comprising a Euclidean distance for the optimal number of spectrally significant second spectral coefficients over a Euclidean distance for the set of second spectral coefficients in each waveform vector satisfies a Quality of Service (QoS) requirements.

In accordance with one or more embodiments, the controller is further programmed to insert the plurality of spectrally significant packet vectors into a data packet, and/or the finite series transform is a Discrete Cosine Transform.

In general, in yet another aspect, the present disclosure relates to a non-transitory computer-readable medium containing program logic that, when executed by operation of one or more computer processors, performs an operation comprising receiving a plurality of data sequences at a controller of a circuit interrupt device, each data sequence containing a set of data points corresponding to a waveform of line current flowing through the circuit interrupt device, performing spectral reduction on the plurality of data sequences using a finite series transform at the controller, and transmitting a spectrally reduced version of the plurality of data sequences to an external system.

BRIEF DESCRIPTION OF THE DRAWINGS

A more detailed description of the disclosure, briefly summarized above, may be had by reference to various embodiments, some of which are illustrated in the appended drawings. While the appended drawings illustrate select embodiments of this disclosure, these drawings are not to be considered limiting of its scope, for the disclosure may admit to other equally effective embodiments.

Identical reference numerals have been used, where possible, to designate identical elements that are common to the figures. However, elements disclosed in one embodiment may be beneficially utilized on other embodiments without specific recitation.

DETAILED DESCRIPTION

This description and the accompanying drawings illustrate exemplary embodiments of the present disclosure and should not be taken as limiting, with the claims defining the scope of the present disclosure, including equivalents. Various mechanical, compositional, structural, electrical, and operational changes may be made without departing from the scope of this description and the claims, including equivalents. In some instances, well-known structures and techniques have not been shown or described in detail so as not to obscure the disclosure. Furthermore, elements and their associated aspects that are described in detail with reference to one embodiment may, whenever practical, be included in other embodiments in which they are not specifically shown or described. For example, if an element is described in detail with reference to one embodiment and is not described with reference to a second embodiment, the element may nevertheless be claimed as included in the second embodiment.

It is noted that, as used in this specification and the appended claims, the singular forms "a," "an," and "the," and any singular use of any word, include plural referents unless expressly and unequivocally limited to one referent. As used herein, the term "includes" and its grammatical variants are intended to be non-limiting, such that recitation of items in a list is not to the exclusion of other like items that can be substituted or added to the listed items.

At a high level, embodiments of the present disclosure provide systems and methods for implementing a communicating circuit breaker and other circuit interrupt or circuit protection devices that can perform spectral reduction on data acquired by the breaker. The breaker acquires the data by sampling at a high sampling rate the line current passing through the breaker. The breaker then performs spectral reduction by applying a finite series transform that converts the data from time domain to frequency domain. In some embodiments, the finite series transform used is a Discrete Cosine Transform (DCT), which produces a set of frequency domain coefficients for a set of time domain data. Other finite series transforms that operate similarly to the DCT may of course be used. The DCT has a property that coefficients containing the most "spectral energy" are grouped near the low frequency end of the spectrum. These DCT coefficients are considered to be "spectrally significant" because they greatly influence accurate reconstruction of the data. The breaker retains these spectrally significant DCT coefficients and discards the remaining coefficients based on a quality of service (QoS) requirement.

A second application of the DCT is then performed on the spectrally significant coefficients to produce a second set of DCT coefficients in which spectrally significant coefficients are again clustered near the front of the spectrum. The breaker again retains only the spectrally significant coefficients from the second set of DCT coefficients based on the QoS requirement. The retained spectrally significant coefficients are then packetized and transmitted to an external system. At the external system, the spectral reduction process is performed in reverse using an inverse finite series transform to reconstruct the waveform to within the QoS requirement. In this way, the breaker can communicate high-resolution information on the line current, such as metering and usage information, by transmitting only a small number of spectrally significant DCT coefficients. The above arrangement effectuates transmission of a large amount of data to an external system in real time using a minimum amount of power and bandwidth (i.e., transmission capacity). The latter is particularly advantageous where the breaker transmits the data over Wi-Fi, Bluetooth, or other bandwidth constrained connections. Several such breakers may then be installed in a load center to provide home and building owners with real-time data for energy usage tracking and management purposes.

Figure 1:
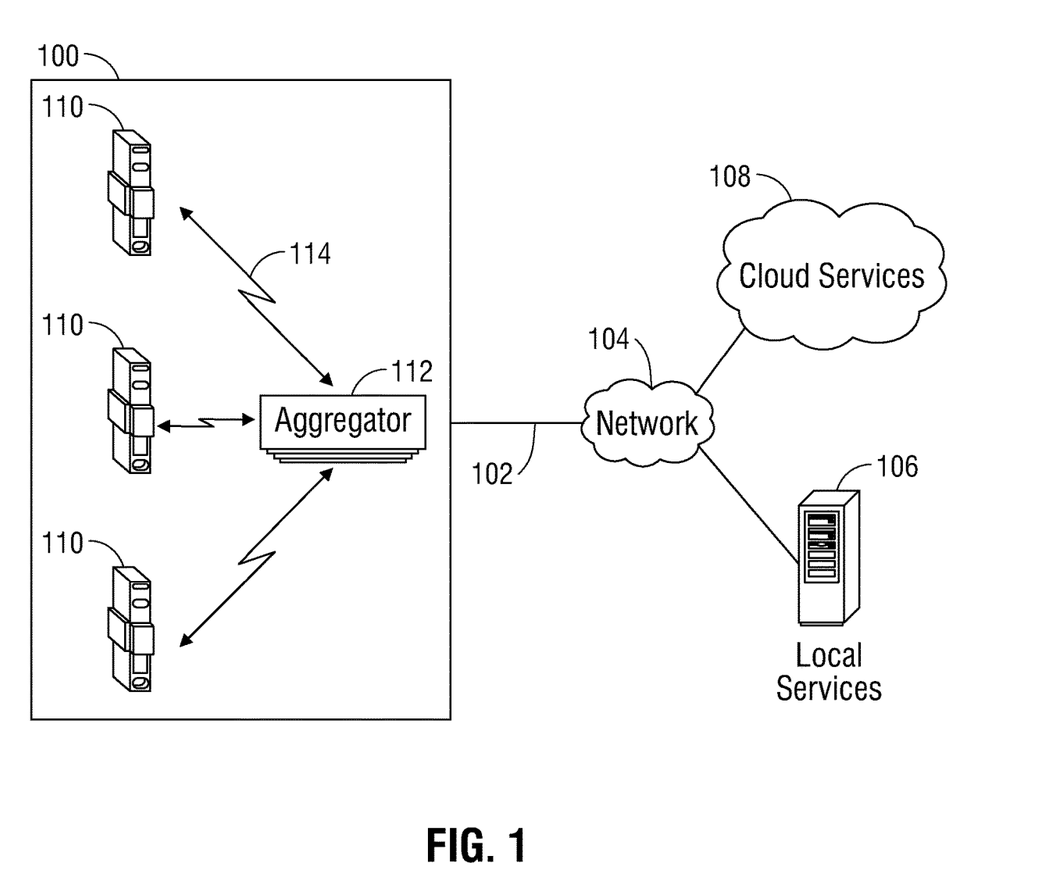
FIG. 1 is a schematic diagram illustrating an exemplary load center utilizing circuit breakers according to embodiments of the present disclosure.

Referring now to FIG. 1, a schematic diagram of an exemplary load center 100 is shown according to some embodiments of the present disclosure. The load center 100 may be a residential load center designed with current capacities suitable for homes and other residential settings, or it may be a commercial load center designed with higher current capacities suitable for office buildings and other commercial settings. In either case, the load center 100 is equipped with networking capability that allows the load center to connect via a network connection 102 to a network 104. The network 104 in turn provides the load center 100 with access to one or more local network services 106 as well as cloud or Internet-based services 108 (e.g., data storage, data processing, data analysis, etc.). Examples of suitable load centers that may be used as the load center 100 include the EcoStruxure™ line of intelligent load centers available from Schneider Electric USA, Inc., of Boston, Mass.

A plurality of communicating circuit breakers 110 (only three shown for economy) are installed in the load center 100 to provide overcurrent and short-circuit protection. These electronic circuit breakers 110 have standard form factors that allow them to be mounted in typical breaker slots of typical panelboards (not expressly shown). The breakers 110 can come in any available size, including molded-case circuit breakers (MCCB), miniature circuit breakers (MCB), and other sizes, and can include any available fault detection functionality, such as arc fault detection, ground fault detection, combination arc fault-ground fault detection, and other functionalities.

In accordance with embodiments of the disclosure, one or more (or all) of the circuit breakers 110 are electronic circuit breakers that can communicate information about various operational aspects of the breakers to an external system. The operational information may include for example whether the breaker 110 is on/off, tripped, reset, locked out, and the like. Each of the one or more breakers 110 can also monitor the current on the line being protected for the presence of broadband signals that may indicate an arc fault or other fault. The breakers 110 can then provide the monitoring results to an external system, such as an aggregator 112 within the load center 100. As well, the breakers 110 can provide data for deriving current usage (i.e., metering) information and usage type (i.e., context) information on the electrical loads being monitored by the breakers. The circuit breakers 110 can obtain the data for the above information by performing high-frequency or high-resolution sampling of the current and/or voltage waveforms on the line being protected.

In most embodiments, the breakers 110 provide the above data to the aggregator 112 in the form of data packets. The aggregator 112 collects the data packets from the breakers 110 and forwards them to the network 104. Any aggregator device that can receive and forward data packets may be used as the aggregator 112, including a gateway, a hub, a router, an edge computing device, and the like. The aggregator 112 can be a discrete component that is installed in the load center 100 or it can be integrated functionality that is built into one of the panelboards (not expressly shown) in the load center 100. Various load processing models and machine learning (ML) based algorithms may be provided in the aggregator 112 for performing load recognition, disaggregation (i.e., separation), and other functions, particularly where the aggregator 112 is an edge computing device. Further reduction of data can also be done at the edge computing device as well based on group packetization of data from several breakers 110. Although one aggregator 112 is depicted, there may be multiple aggregators in the load center 100, each aggregator assigned to collect and forward data packets for a subset of breakers 110.

In some embodiments, the breakers 110 transmit the data to the aggregator 112 over a wireless connection 114. Each breaker 110 includes the ability to connect to the aggregator 112 using Bluetooth, Wi-Fi, or other wireless technology. It is also possible of course for the breakers 110 to transmit the data over a wired connection, such as a twisted-pair connection, and/or forgo the aggregator 112 entirely and send the data directly to the network 104. The use of the aggregator 112 and/or the wireless connection 114, however, offers greater flexibility in configuring the load center 100 for a particular application or purpose in some embodiments.

Whichever connection technology is used, the breakers 110 are programmed to reduce the amount of data before transmitting to the aggregator 112. Consider for example that to sufficiently sample broadband signals on current and/or voltage waveforms, a sampling rate of 20 ksps to 40 ksps (kilo samples/second) is typically required. A similarly high sampling rate may be required to accurately capture load transients and to obtain high-definition shapes of the waveforms during steady-state operation. The AC current itself can also provide substantial information for load detection and disaggregation purposes if sampled at 20 ksps or higher. Likewise, the AC voltage can provide accurate estimates of power, both active and reactive, if sampled at 20 ksps or higher. However, transmitting such high-resolution samples can require as much as 3.375 GB/day or more of bandwidth per breaker (20 ksps×2 bytes/sample×3600 seconds/hour×24 hours/day=3.375 GB/day) and associated power.

The breakers 110 therefore include the ability to reduce the required bandwidth by performing the spectral reduction mentioned earlier on the high-resolution samples to reduce the amount of data that is transmitted to the aggregator 112. As will be explained, the efficient spectral reduction process used in the breakers 110 can reduce the amount of data transmitted from roughly 3.375 GB/day of data per breaker 110 to as little as a few hundred or tens of MB/day or less in some cases, depending on the QoS requirement. This reduction in the amount of data transmitted to the aggregator 112 also significantly reduces the amount of power needed to transmit the data, for both wireless and conducted transmissions.

The reduced amount of data additionally decreases the amount of processing required at the aggregator 112. In particular, significantly less memory and processing time are required at the aggregator 112 to process the data, thus freeing up aggregator resources for other purposes, such as data analysis. This opens up other options for the type of equipment that may be used as the aggregator 112. For example, edge appliances and edge computing devices can be used to both receive and analyze the data rather than sending the analysis off to one of the cloud services 108. Should cloud services 108 be needed, a similar reduction may be achieved in required cloud storage and processing services. This reduction can significantly reduce transactional and other costs associated with cloud-based data stores and other data stores.

The reduction in transmitted data also allows each breaker 110 to packetize the samples into smaller data packets for real-time transmission to the aggregator 112. The smaller data packets can be particularly useful as electronic devices become increasingly connected to one another in the Internet of Things (IoT). In this IoT landscape, circuit breakers and circuit interrupt devices feature as the logical choice to provide current metering, non-intrusive load recognition, and other context-specific usage information to users. The smaller data packet format can also aid expansion of the IoT environment by allowing faster processing for load recognition and disaggregation purposes. Meta data (e.g., load information, processing models, operation states, etc.) may also be transferred in the smaller data packets.

In short, the use of the communicating circuit breakers 110 in the load center 100 can provide home and building owners with a wide range of information about their energy usage in real time. The home/building owners may track and manage overall energy consumption as well as consumption on a per room/area basis, and potentially an individual appliance/equipment basis. Alerts and notifications regarding circuit breaker trips and potential fault conditions may be received in real time from the load center 100 by virtue of the reduction in required bandwidth. Other advantages and benefits of the load center 100 will be readily apparent to those skilled in the art.

Figure 2:
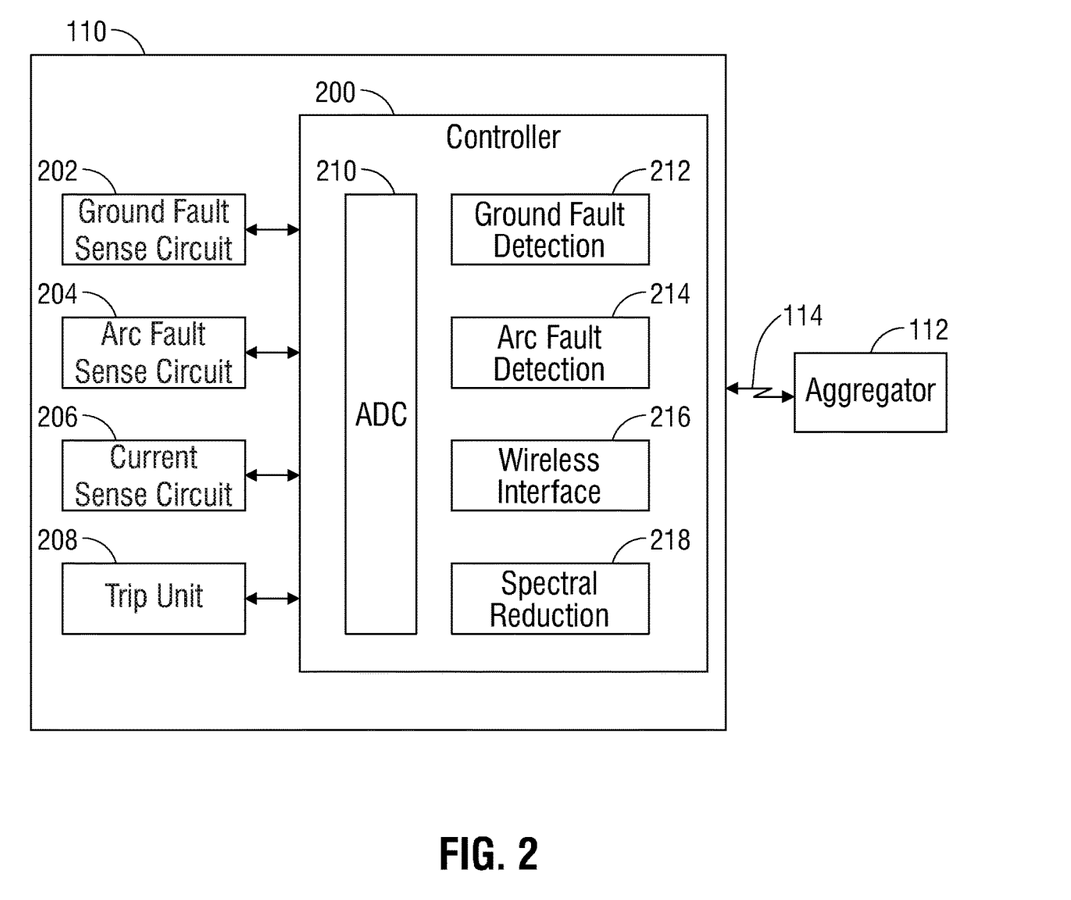
FIG. 2 is a block diagram illustrating an exemplary circuit breaker that can perform spectral reduction according to embodiments of the present disclosure.

FIG. 2 shows a block diagram of an exemplary communicating circuit breaker 110 according to some embodiments of the disclosure. The breaker 110 includes a number of functional components or modules, some of which are represented here by individual blocks. Each block may of course be divided into several constituent blocks, or two or more blocks may be combined into a single block, within the scope of the disclosure. As can be seen, the breaker 110 includes a controller 200, a ground fault sense circuit 202, an arc fault sense signal 204, a current sense circuit 206, and a trip unit 208. The controller 200 itself includes at least one analog-to-digital converter (ADC) 210, a ground fault detection module 212, an arc fault detection module 214, and a wireless interface module 216. It is also possible for the ADC 210 to be a separate component from the controller 200 in some embodiments. Other functional components and modules not expressly shown may also be included within the scope of the disclosure. Likewise, one or more of the expressly shown functional components and modules may be removed without departing from the disclosure.

Operation of the foregoing components and modules is well known in the art and therefore only a brief description of their specific functions is provided below. In general, the controller 200 receives analog signals from the ground fault sense circuit 202, arc fault sense circuit 204, current sense circuit 206, and other sense circuits. These analog signals, which may include current signals and voltage signals, are sampled by the ADC 210 at a certain frequency, for example 20 ksps to 40 ksps, or other sufficiently high sampling rate for load detection and disaggregation, and/or for waveform shape detection. The ADC 210 converts each sample into a numerical value that is proportional to an amplitude of the sample and outputs this value as data. The data is then processed in a known manner by the various modules in the controller 200 to detect occurrence of ground faults, arc faults, short-circuits, and so forth. Upon detecting a fault condition, the controller 200 issues a trip signal to the trip unit 208 that causes the trip unit to immediately shut off further current flow through the breaker. Any suitable controller may be used as the controller 200, including one of the PIC series of microcontrollers from Microchip Technology, Inc., an ARM (Advanced RISC Machine) based microcontroller, as well as a digital signal processor (DSP), an ASIC, and the like.

The controller 200 also transmits the data through the wireless interface 216 to the aggregator 112 for forwarding to the network 104 (see FIG. 1). Before transmission, however, the data is reduced by a spectral reduction module 218 in the controller 200 that reduces the amount of data transmitted. As mentioned earlier, a sampling rate of 20 ksps can produce about 3.375 GB/day of data per breaker 110 or more if the data is transmitted in an unreduced form. The spectral reduction module 218 can reduce the amount of data transmitted to a few hundred MB/day per breaker 110, depending on the QoS requirement, by performing spectral reduction on the data. As also mentioned earlier, the spectral reduction module 218 uses the Discrete Cosine Transform (DCT) in some embodiments to implement the spectral reduction on the data. Other suitable finite series transform may also be used, including any of the Discrete Fourier related transforms, within the scope of the disclosure.

The DCT is a generally well-known transform that expresses a time domain sequence of values, such as amplitude samples at points along a waveform, in terms of a sum of frequency domain cosine functions. Equation (1) below shows an example of a 1-D (1-dimensional) DCT, where x(i) is a data point in a sequence of N samples to be transformed, y[k] is a DCT coefficient that represents N samples in the frequency domain, and $C_k$ are arbitrary constants with $C_0=1/\sqrt{2}$ and $C_k=1$ for k≠0. See Taylor, F. and The Athena Group, Inc., Mellot J., *Hands-On Digital Signal Processing*, Gainesville, Fla.: McGraw Hill, 1998; and Jain, A. K., *Fundamentals of Digital Image Processing*, Englewood Cliffs, N.J.: Prentice-Hall, 1989. The DCT coefficients have the characteristic that, for a given current or voltage waveform, most of the useful information (i.e., the "spectral energy") in the waveform is concentrated in a small subset of coefficients near the front (i.e., low frequency) portion of the spectrum. This allows the remaining (i.e., high-frequency), least influencing coefficients to be discarded with minimal impact on the ability to reconstruct the waveform, or shape thereof, accurately within a given QoS requirement. Hereinafter the term "waveform" can refer to a current waveform or a voltage waveform.

$$DCT:\ y[k] = \frac{C_k}{2} \sum_{i=0}^{N-1} x[i]\cos\left(\frac{(2i+1)k\pi}{2N}\right) \quad \text{Eq. (1)}$$

Figure 3:
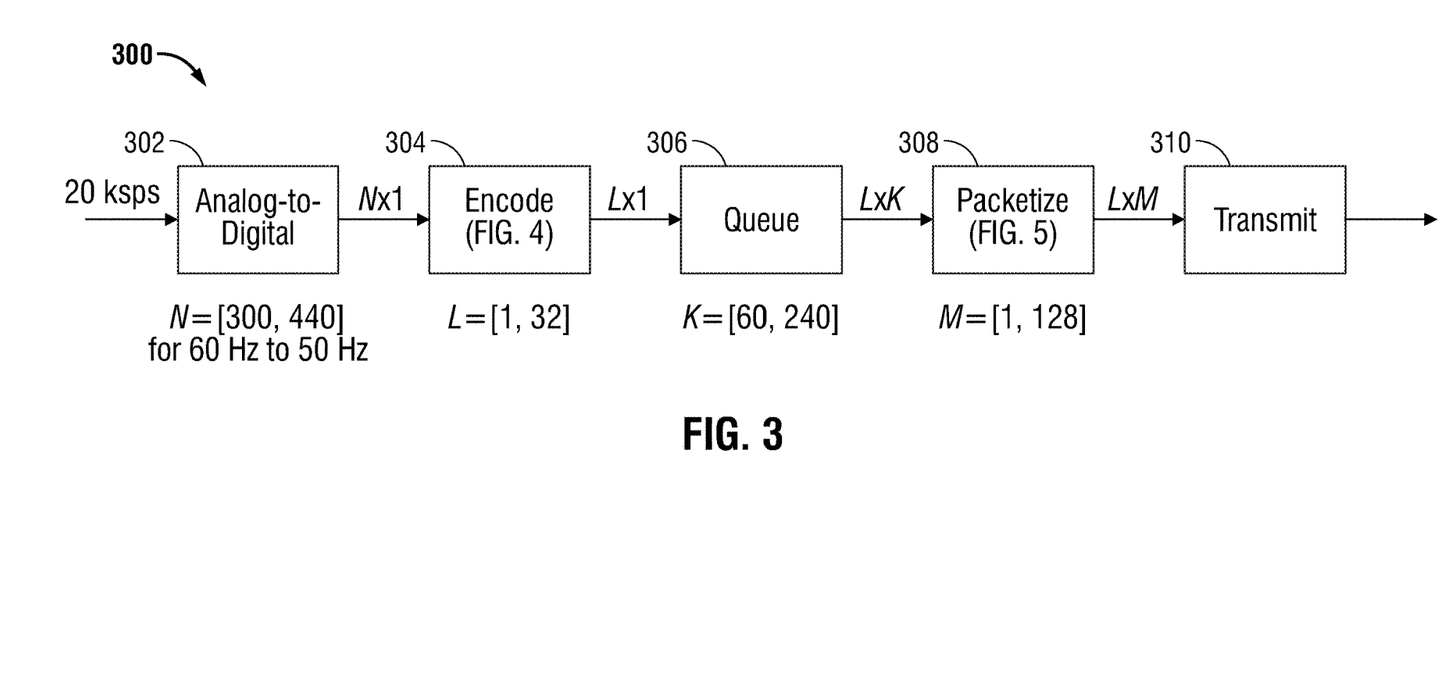
FIG. 3 is a flow diagram illustrating an exemplary spectral reduction process for a circuit breaker according to embodiments of the present disclosure.

FIG. 3 is a flow diagram illustrating a method 300 that a controller (e.g., controller 200) may use to implement spectral reduction on high-resolution samples of the waveforms passing through a breaker (e.g., breaker 110) in some embodiments. In general, the spectral reduction is performed by applying the DCT to a series of K sequential waveforms that are to be transmitted in a data packet, with N samples per waveform. The N samples of each waveform constitute a data sequence for that waveform. For a 60 Hz line current and a 20 ksps sampling rate, the number of samples per waveform is about 336. The value of K is usually the same across all data packets and may range, for example, from about 60 to 240 waveforms (about 1 to 4 seconds of sampling). In the above example, for instance, there are 240 waveforms per data packet and 336 data points per waveform, representing a total of [336×240] (i.e., [N×K]) data points per packet that are to be transmitted in a reduced form.

The DCT is applied to the groups of [N×K] data points in two stages, a first DCT stage and a second DCT stage that is performed in a direction orthogonal to the first DCT stage. The first DCT stage is performed on the data points themselves using Equation (1) above and results in an [N×K] matrix of first (1-D) coefficients. As discussed further below, most of the spectral energy in this matrix of first (1-D) coefficients is concentrated in a small subset of [L×K] coefficients that are spectrally significant. The second DCT is then performed on the subset of spectrally significant first (1-D) coefficients, also using Equation (1), resulting in an [L×K] matrix of second (2-D) coefficients. As also discussed below, most of the spectral energy in this matrix of second (2-D) coefficients can be found in a small subset of [L×M] coefficients that are spectrally significant. The method 300 then packetizes the subset of spectrally significant second (2-D) coefficients into a data packet and transmits the data packet to an external system (e.g., aggregator 112).

Stated more concisely, given a set of K waveforms, each waveform having N time domain samples, the method 300 reduces N→L and K→M, where L N and M K, and where → represents transformation of the time domain samples into frequency domain coefficients and reduction of the number of frequency domain coefficients.

Referring to FIG. 3, the method 300 generally begins at an analog-to-digital block 302 where analog-to-digital conversion is performed (e.g., by ADC 210) that converts the high-resolution samples of the K waveforms into data, one data point per sample. The analog-to-digital block 302 thereafter groups the data points into data vectors (i.e., a 1-dimensional matrix) on a per waveform basis for each of the K waveforms, with N data points per data vector. The value of N may vary between about 300 to 440 data points per data vector depending on the fundamental frequency of line voltage (50 Hz to 60 Hz+/−10%) and the ADC sampling rate. The result from the analog-to-digital block 302 is a set of K data vectors, each data vector having [N×1] data points.

The method 300 next proceeds to an encode block 304 where the set of K data vectors from the analog-to-digital block 302 are encoded (e.g., by spectral reduction module 218). The encoding process at the encode block 304 involves applying Equation (1) to the set of K data vectors on a per data vector basis to produce a set of K waveform vectors, each waveform vector having [N×1] 1-D coefficients corresponding to the [N×1] data points in a respective data vector. For each of these waveform vectors, most of the spectral energy is contained in a small subset of [L×1] spectrally significant coefficients near the front portion of the frequency spectrum, where L N. The encoding process then derives an optimum value for L that can be applied across each waveform vector, as detailed later in FIG. 4. In some embodiments, the optimum value for L may range from 16 to 32, which reflects a potential reduction factor of 5× to 12× from the original N data points per waveform (i.e., from 336 data points down to 32 spectrally significant coefficients). The output from the encode block 304 is a spectrally significant waveform vector having [L×1] spectrally significant 1-D coefficients for each one of the K data vectors.

Each spectrally significant waveform vector from the encode block 304 is then queued sequentially (e.g., by a first-in-first-out (FIFO) buffer) at block 306 for the K data vectors. The value of K may be selected as needed and may depend on a given QoS level that accounts for, among other things, load transition frequency, such as devices switching on/off and connecting/disconnecting, and the like. As mentioned earlier, the value of K may vary from about 60 to 240 waveforms (representing 1 to 4 seconds of sampling). The output from the queue at block 306 is a set of K spectrally significant waveform vectors, each vector having [L×1] spectrally significant 1-D coefficients, for a total of [L×K] spectrally significant 1-D coefficients.

The method 300 thereafter proceeds to a packetize block 308, where the [L×K] spectrally significant 1-D coefficients from the queue at block 306 is packetized (e.g., by spectral reduction module 218). The packetizing process at the packetize block 308 involves applying Equation (1) to the [L×K] spectrally significant 1-D coefficients to produce a set of L packet vectors, each packet vector having [1×K] 2-D coefficients. Note that the packet vectors run in an orthogonal direction to the spectrally significant waveform vectors such that, for each packet vector, every 2-D coefficient in that packet vector comes from a different spectrally significant waveform vector. And, as alluded to earlier, for each of the packet vectors, most of the spectral energy is contained in a small subset of [1×M] spectrally significant coefficients near the front portion of the frequency spectrum, where M K. The packetizing process then determines an optimum value for M that can be applied to each packet vector, as detailed later in FIG. 5. In some embodiments, the optimum value for M may range from 1 to 128 depending on the QoS requirement. The output from the packetize block 308 is a set of L spectrally significant packet vectors, each having [1×M] spectrally significant 2-D coefficients, for a total of [L×M] spectrally significant 2-D coefficients.

The packetizing process then arranges the [L×M] spectrally significant 2-D coefficients in a data packet P. This involves inserting the [L×M] spectrally significant 2-D coefficients and the L, M, and K values, into a particular packet format along with other needed information. The resulting data packet P [L×M] is thereafter provided to a transmit block 310 for transmission by a network interface (e.g., network interface 216) to an external system (e.g., aggregator 112).

Figure 4:
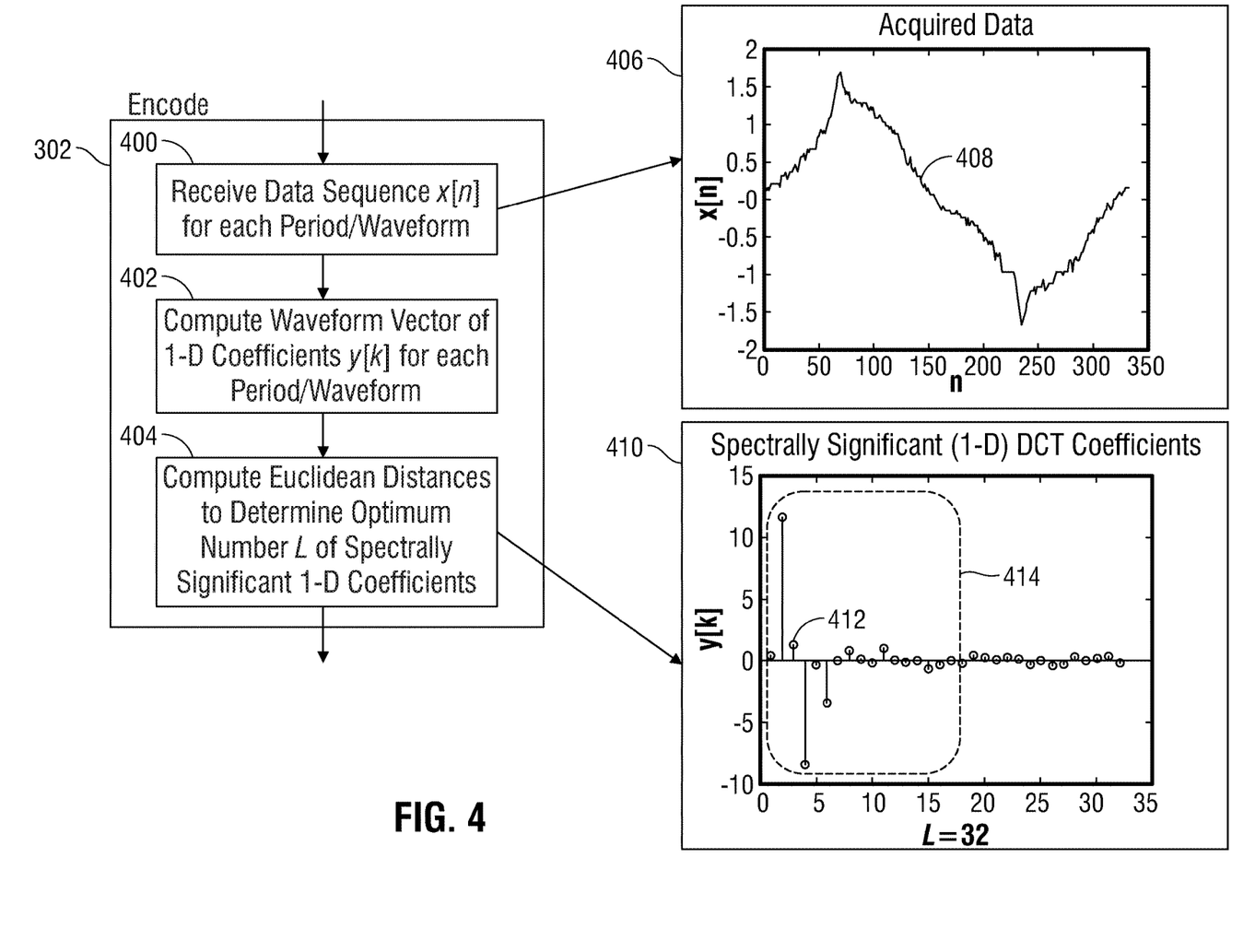
FIG. 4 is a flow diagram illustrating a portion of the exemplary spectral reduction process from FIG. 3 according to embodiments of the present disclosure.

FIG. 4 is a flow diagram illustrating the encode block 304 of FIG. 3 in more detail according to some embodiments. As can be seen, the encode block 304 begins at a data subblock 400 that receives, for each waveform sampled, a time domain data sequence x[n] spanning the period of the waveform. The data subblock 400 then outputs an N-length data vector for each data sequence x[n] that is received.

Next, a DCT subblock 402 receives the data vector for each data sequence x[n] from the data subblock 400 and derives 1-D coefficients y[k] for the data points in the data vector. This is the first of two DCT stages mentioned earlier. The DCT subblock 402 may derive the 1-D coefficients y[k] by applying Equation (1) to the data points to produce a waveform vector. For a data sequence x[n] containing N data points, the DCT subblock 402 produces an N-length waveform vector having [N×1] 1-D coefficients y[k], each spectral coefficient y[k] corresponding to one data point in the data sequence.

Thereafter, a waveform reduction subblock 404 receives each N-length waveform vector from the DCT subblock 402 to determine an optimum number L of spectrally significant coefficients in the vector. As mentioned earlier, a characteristic of the DCT is that, for a given waveform, most of the "spectral energy" of the waveform is concentrated in a small subset of coefficients near the low end of the frequency spectrum. The remaining coefficients can be discarded as not spectrally significant based on a given QoS requirement. In some embodiments, the optimum value for L is determined by calculating a Euclidian distance d for all 1-D coefficients y[k] in each waveform vector, as set out in Equation (2) below. For context, the Euclidian distance d is proportional to the spectral energy contained in the 1-D coefficients y[k]. A Euclidian distance d' is also calculated for the L spectrally significant coefficients y[k] contained in each waveform vector, as set out in Equation (3). The optimum value of L can then be determined as the value that results in a spectral ratio ρ, as set out in Equation (4), that satisfies a given QoS requirement. The spectral ratio ρ may range between, for example, 0.90 and 0.99 based on the particular QoS requirement. The output from the waveform reduction subblock 404 is an L-length spectrally significant waveform vector having [L×1] spectrally significant 1-D coefficients y[k].

$$d = \sqrt{\sum_{k=1}^{N} |y_k|^2} \qquad \text{Eq. 2}$$

$$d' = \sqrt{\sum_{k=1}^{L} |y_k|^2} \qquad \text{Eq. 3}$$

$$\rho = \frac{d'}{d} \qquad \text{Eq. 4}$$

Plot 406 graphically depicts an exemplary waveform 408 for which a data sequence x[n] was received in the data subblock 400. In the plot, the horizontal axis shows the data point number and the vertical axis shows the value of each data point. The waveform 408 in this example has a frequency of 60 Hz and the data points were acquired using a sampling rate of 20 ksps, resulting in an N of about 336 data points for the data sequence x[n].

Plot 410 graphically depicts an exemplary set of L spectrally significant coefficients in a spectrally significant waveform vector. In this plot, the horizontal axis indicates the coefficient number for the L spectrally significant coefficients and the vertical axis shows the strength for each coefficient, one of which is labeled 412. As can be seen, the optimum value for L is 32 in this example, based on a spectral ratio ρ of 0.99. For a different QoS corresponding for example to a spectral ratio ρ of 0.90, the optimum value of L may be reduced to 16 spectrally significant coefficients, as indicated by box 414.

Figure 5:
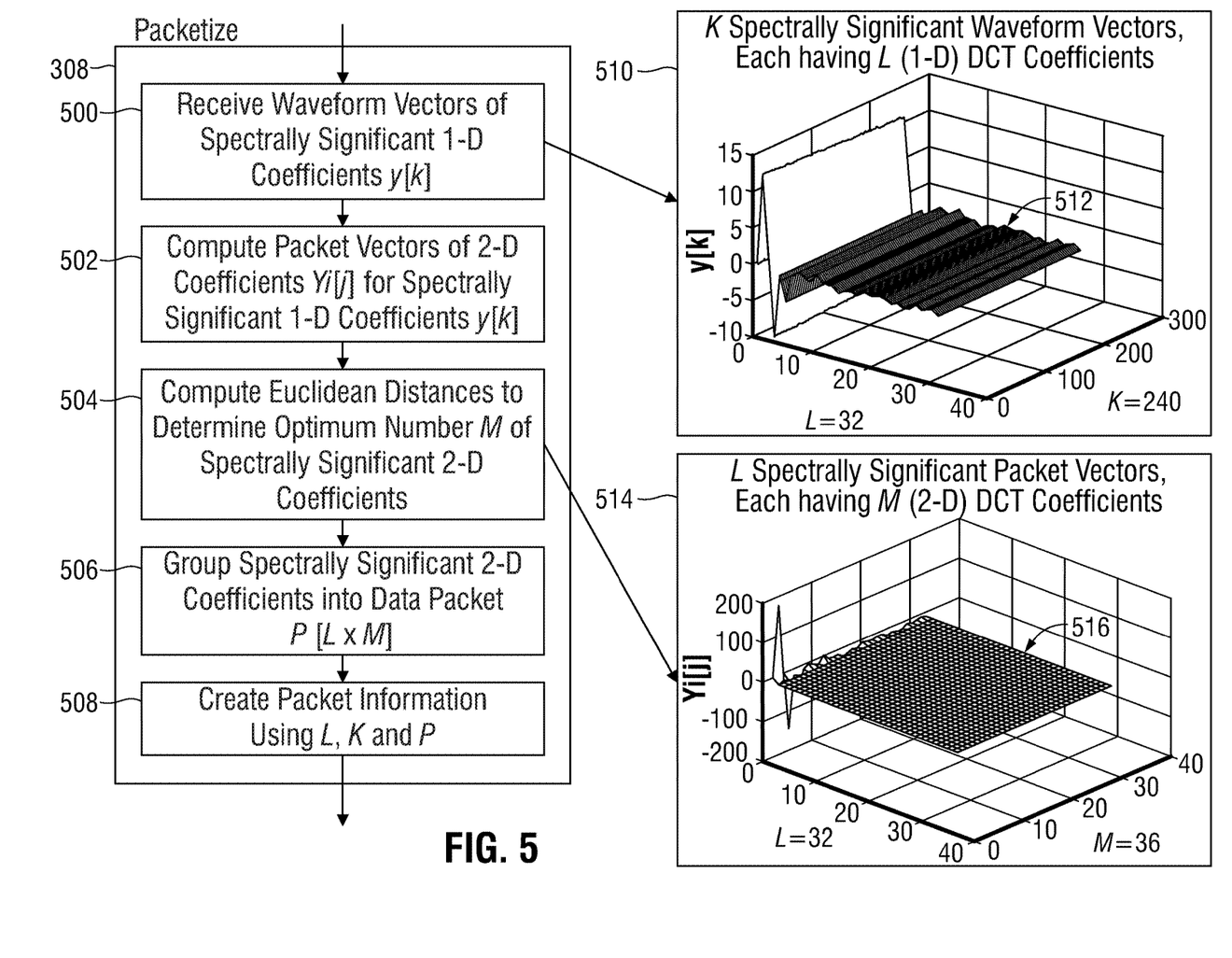
FIG. 5 is a flow diagram illustrating another portion of the exemplary spectral reduction process from FIG. 3 according to embodiments of the present disclosure.

FIG. 5 is a flow diagram illustrating the packetize block 308 of FIG. 3 in more detail in some embodiments. As this example shows, the packetize block 308 includes a waveform subblock 500 that receives the L-length spectrally significant waveform vectors. For a given data packet, there are K such spectrally significant waveform vectors, each vector having [L×1] spectrally significant 1-D coefficients, for a total of [L×K] spectrally significant 1-D coefficients. For efficient processing purposes, the [L×K] spectrally significant 1-D coefficients can be received in matrix form or on a vector by vector basis. In the latter case, each of the K spectrally significant waveform vectors is queued in turn until the queue contains the equivalent of an [L×K] matrix of spectrally significant 1-D coefficients.

Next, a DCT subblock 502 receives the [L×K] matrix of spectrally significant 1-D coefficients and derives 2-D coefficients $Y_l[j]$ for the 1-D coefficients in the [L×K] matrix. This is the second DCT stage referenced earlier. The DCT subblock 502 can derive the 2-D coefficients $Y_i[j]$, for example, by applying Equation (1) to the 1-D coefficients $y[k]$ in a known manner (i.e., $Y_i[j]$=DCT($y[k]$)). In some embodiments, Equation (1) is applied in a direction that is orthogonal to the K spectrally significant waveform vectors to produce a set of L packet vectors, each packet vector having [1×K] 2-D coefficients $Y_i[j]$. The result is, for each packet vector, every 2-D coefficient $Y_i[j]$ in that packet vector corresponds to a different one of the K spectrally significant waveform vector. The output of the DCT subblock 502 a set of L packet vectors, each vector having [1×K] 2-D coefficients $Y_i[j]$, for a total of [L×K] 2-D coefficients $Y_i[j]$.

Thereafter, a packet reduction subblock 504 receives the [L×K] 2-D coefficients $Y_i[j]$ to determine an optimum number M of spectrally significant 2-D coefficients. This can be done, in some embodiments, using Equations (2)-(4) from above (or variations thereof) to calculate the Euclidean distance for all 2-D coefficients $Y_i[j]$ in each packet vector, then calculating the Euclidian distance for the M spectrally significant 2-D coefficients $Y_i[j]$ within each packet vector. The optimum value for M can then be determined as the value that results in the spectral ratio ρ satisfying a given QoS requirement. The spectral ratio ρ may again range between 0.90 and 0.99 in some embodiments, depending on the QoS requirement. The result is a set of L spectrally significant packet vectors, each vector having [1×M] spectrally significant 2-D coefficients $Y_i[j]$, for a total of [L×M] spectrally significant 2-D coefficients $Y_i[j]$. The [L×M] spectrally significant 2-D coefficients $Y_i[j]$ can then be used to reconstruct the original [N×K] data points to within a certain QoS level. Thus, by giving up some high-frequency content, the number of DCT coefficients required to sufficiently reconstruct a waveform within a given QoS level can be significantly reduced (i.e., mainly quantization noise is what gets filtered out).

A format subblock 506 receives the [L×M] spectrally significant 2-D coefficients $Y_i[j]$ from the packet reduction subblock 504 and places them into a data packet P [L×M] according to a particular packet format for transmission. Any suitable packet formats known to those skilled in the art may be used for the data packet without departing from the scope of the disclosure. An exemplary data packet P [L×M] is discussed later herein with respect to FIG. 8.

The data packet P [L×M] containing the spectrally significant 2-D coefficients $Y_i[j]$ from the format subblock 506 is then provided to an overhead subblock 508 to create packet header information and other information needed to reconstruct the original [N×K] data points. Such information may include or be created using the values of K, L and M discussed above as well as other data for the data packet P [L×M].

Plot 510 graphically depicts an exemplary set of K spectrally significant waveform vectors, indicated at 512, that may be received at the coefficient subblock 500. In the plot, the horizontal axis shows the coefficient number for the spectrally significant 1-D coefficients, the vertical axis shows the strength of each coefficient, and the depth axis shows the waveform number for each of the K waveform vectors. For this example, there are 240 waveform vectors being reduced to form each data packet, each waveform vector having 32 spectrally significant 1-D coefficients, based on some given QoS requirement.

Plot 514 graphically depicts an exemplary data packet P [L×M] of spectrally significant 2-D coefficients, indicated at 516, that may be produced at the format subblock 506. In this plot, the horizontal axis shows the coefficient number for the L spectrally significant 2-D coefficients, the vertical axis shows the strength of each coefficient, and the depth axis shows the coefficient number for each of the M spectrally significant 2-D coefficients. For this example, the optimum value of L has been determined to be 32 and the optimum value of M has been determined to be 36 based on a given QoS requirement. Depending on the QoS requirement, a potential reduction factor of 5× to 20× from the original K waveform vectors may be realized (e.g., from 240 down to 36 waveform vectors). The data packet P [L×M] may then be transmitted to an external system using considerably less bandwidth and power compared to transmitting data in an unreduced form.

Table 1 below shows exemplary amount of data transmitted for several (13) data packets for an exemplary breaker according to some embodiments. In the table, the P [L×M] column shows the size of each data packet in terms of the optimum number of L and M spectrally significant coefficients and the data type (single=4 Bytes), while the Energy (%) column shows the spectral energy content retained by each data packet as a percentage of the original, unreduced spectral energy content. Each data packet spanned a sampling interval of 4 seconds (K=240 waveforms) except the data packet in the last row, which lasted 2.5 seconds, for a total sampling interval of 50.5 seconds. The optimum value for L was determined to be 32 across the data packets and the optimum value for M varied according to the waveform samples for each data packet. The total amount of data transmitted over the 50.5 seconds was 76,625 Bytes, which translates to a required bandwidth of 126.1 MB/day (76,625 Bytes÷50.5 seconds×3600 seconds/hour×24 hours/day), which is far less than the 3.375 GB/day of bandwidth that would have been required had the data been transmitted unreduced. Note that several factors, including frequency of transitions (fast or slow transients), can increase or decrease the number of coefficients required for each packet, and therefore the size of the packets transmitted by the breaker can vary.

TABLE 1

Amount of Data Transmitted per Packet

| Packet # | P [L × M] | M | K (4s) | Energy (%), L = 32 | Bytes |
|---|---|---|---|---|---|
| 1 | 32 × 41 single | 41 | 240 | 84.56% | 5248 |
| 2 | 32 × 102 single | 102 | 240 | 90.57% | 13056 |
| 3 | 32 × 40 single | 40 | 240 | 99.82% | 5120 |
| 4 | 32 × 24 single | 24 | 240 | 99.69% | 3072 |
| 5 | 32 × 36 single | 36 | 240 | 99.57% | 4608 |
| 6 | 32 × 54 single | 54 | 240 | 99.53% | 6912 |
| 7 | 32 × 47 single | 47 | 240 | 99.45% | 6016 |
| 8 | 32 × 40 single | 40 | 240 | 99.35% | 5120 |
| 9 | 32 × 54 single | 54 | 240 | 99.27% | 6912 |
| 10 | 32 × 39 single | 39 | 240 | 99.22% | 4992 |
| 11 | 32 × 47 single | 47 | 240 | 99.19% | 6016 |
| 12 | 32 × 56 single | 56 | 240 | 99.10% | 7168 |
| 13 | 32 × 33 single | 33 | 154 | 99.05% | 4224 |

For reference, an exemplary [L×M] matrix of spectrally significant coefficients is shown in Table 2 below, where L extends down and M extends across. Such an [L×M] matrix may then be included in one of the data packets from Table 1 for transmission by the breaker (or other circuit protection device).

TABLE 2

Matrix of Spectrally Significant Coefficients

| L × M | 1 | 2 | 3 | 4 | 5 | 6 | ... |
|---|---|---|---|---|---|---|---|
| 1 | 0.328147 | 0.46899 | 0.014071 | 0.189514 | −0.50218 | −0.285 | −0.04128 |
| 2 | 123.3972 | 9.073149 | 8.348643 | 17.23315 | 2.54667 | −9.99246 | 5.772872 |
| 3 | −41.1827 | −9.63262 | −0.82118 | 6.678512 | −1.07536 | −5.81981 | 3.202426 |
| 4 | −98.8184 | −12.86 | −9.20525 | −16.3541 | −3.2456 | 9.460416 | −5.22338 |
| 5 | −4.09619 | −0.47298 | −0.04318 | −0.30297 | 0.308367 | −0.00681 | −0.04213 |
| 6 | −69.8283 | −16.6537 | −9.80787 | −14.7546 | −3.36007 | 7.763303 | −3.96868 |
| 7 | −40.8684 | 14.70151 | 3.888582 | −10.8922 | 1.995416 | 11.65408 | −5.83052 |
| ... | 51.20016 | 20.90072 | 9.773629 | 11.78581 | 4.130432 | −6.12535 | 2.356154 |

Figure 6:
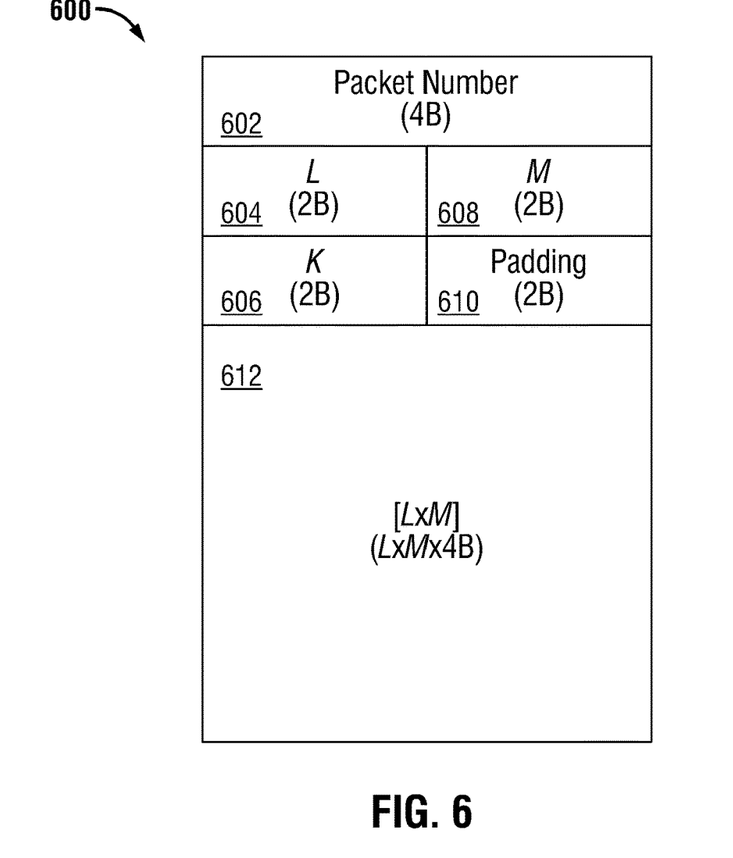
FIG. 6 is a block diagram illustrating an exemplary data packet for transmitting data that has been reduced according to embodiments of the present disclosure.

FIG. 6 illustrates an exemplary data packet 600 containing data that has been reduced according to the spectral reduction disclosed herein. As can be seen, the data packet 600 has several segments of data, including a 4-Byte packet number 602 along with data representing certain information needed to reconstruct the data carried by the packet. This information includes the values for L 604, M 606, and K 608, each segment requiring 2 Bytes. Note that the ordering of the information shown here is only for illustrative purposes, and that a different arrangement of the information may be used within the scope of this disclosure. In some embodiments, the data packet 600 may also include a certain number of empty or null segments 610 for padding purposes to ensure the overall length of the data packet conforms to a predefined packet length requirement. The padding is needed in these embodiments because the [L×M] matrix 612 of spectrally significant coefficients (4 Bytes per coefficient) contained in the packet may vary in number of coefficients, depending on frequency of transitions in the waveform and other factors.

Figure 7:
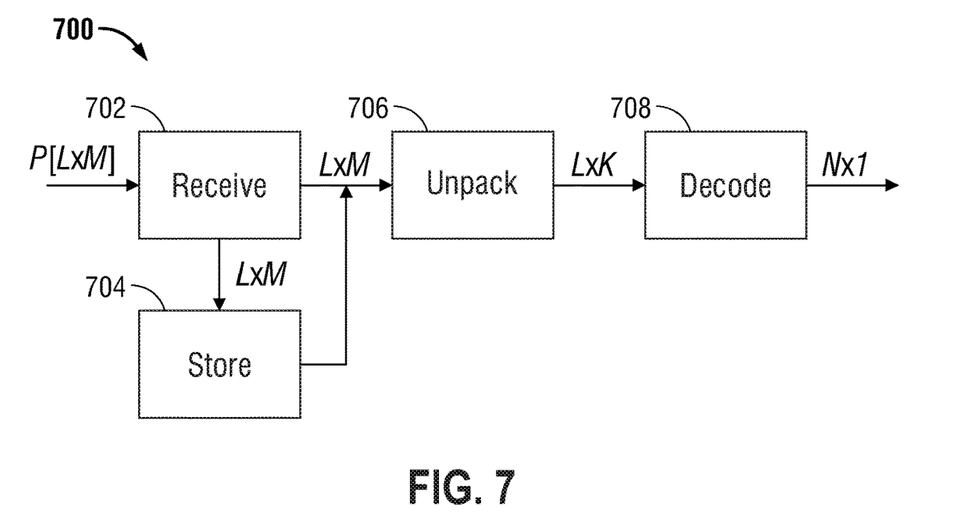
FIG. 7 is a flow diagram illustrating an exemplary spectral reconstruction process for a circuit breaker according to embodiments of the present disclosure.

Turning now to FIG. 7, an exemplary method 700 is shown that may be used by an external system (e.g., aggregator 112, local services 106, cloud services 108) to receive and reconstruct the data sequences x[n] from the data packet P [L×M] in some embodiments. In general, the data packet P [L×M] can be reconstructed by performing the spectral reduction method 300 described in FIG. 3 in reverse order, including using an inverse DCT. Thus, the reconstruction method 700 begins by receiving the data packet P [L×M] at a receive block 702. At this block 702, packet header and other packet related overhead can be removed to retrieve the [L×M] spectrally significant 2-D coefficients $Y_i[j]$. An unpack block 704 processes the [L×M] matrix by performing the steps described above with respect to the packetize block 308, but in reverse order, to recover the [L×K] spectrally significant 1-D coefficients y[k]. Thereafter, a decode block 706 processes the [L×K] matrix by performing the steps described above with respect to the encode block 304, but in reverse order, to recover each N-length data sequence x[n]. Specifically, each [1×M] spectrally significant packet vector is zero-filled up to the size of K and each [L×1] spectrally significant waveform vector is zero-filled up to the size of N, then the respective inverse discrete cosine transformation is performed to recover the full signal back to its original waveform shape and size with very minimal losses based on the specified QoS that was requested. In some embodiments, the [L×M] matrix retrieved by the receive block 702 may also be stored for further processing in a storage system or database at a store block 704.

Figure 8:
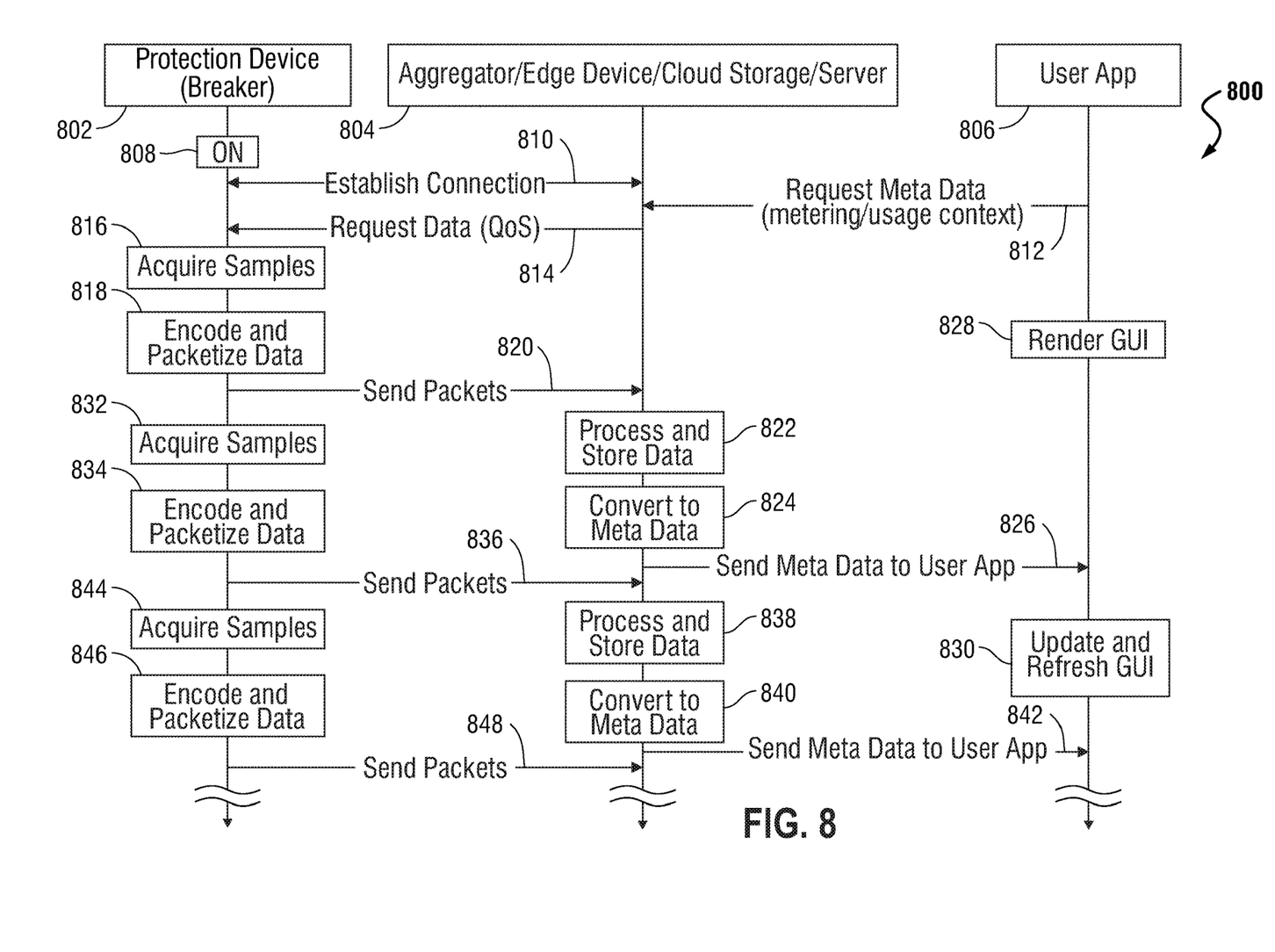
FIG. 8 is a sequence diagram illustrating an exemplary communication between a circuit breaker, an external system, and an end user according to embodiments of the present disclosure.

FIG. 8 illustrates a sequence diagram 800 showing exemplary communication of data that has been reduced according to the spectral reduction disclosed herein. The communication in this example occurs between a breaker 802 or other circuit protection device, an external system 804 (e.g., aggregator, edge computing device, cloud storage, server, etc.), and a user app 806 (e.g., building management system, etc.).

The sequence diagram 800 generally begins with the breaker 802 turning on at 808 and attempting to establish a connection at 810 with the external system 804. At 812, the external system 804 receives a request for meta data, such as metering or usage context data, from the user app 806. The external system 804 then sends a request for data at 814 to the breaker 802 and specifies a certain QoS level that may be based on the type of information being requested. At 816, the breaker 802 acquires a set of waveform samples, either as part of a regular sampling routine or specifically in response to the request, and converts the samples to data. The breaker 802 then encodes and packetizes the data into data packets at 818 using the spectral reduction discussed herein, and transmits the data at 820 to the external system 804. At 822, the external system 804 processes and stores the data, then converts the data to meta data at 824. The external system 804 thereafter sends the meta data at 826 to the user app 806. In the meantime, the user app 806 is rendering a graphical user interface (or other applications) at 828 in preparation for receiving the meta data, which is received at 830 and used to update and refresh the graphical user interface (or other applications).

At 832, the breaker 802 acquires additional waveform samples and converts them into data, then encodes and packetizes the data at 834 into data packets. At 836, the breaker 802 transmits the data packets to the external system 804, which processes and stores the data at 838 and converts the data to meta data at 840. The external system 804 thereafter sends the meta data at 842 to the user app 806 were the meta data is used to update and refresh the graphical user interface (or other applications). The above process continues at 844 with the breaker 802 again acquiring additional waveform samples and converting them into data, then encoding and packetizing the data at 834 into data packets, and so on as described.

Figure 9A:
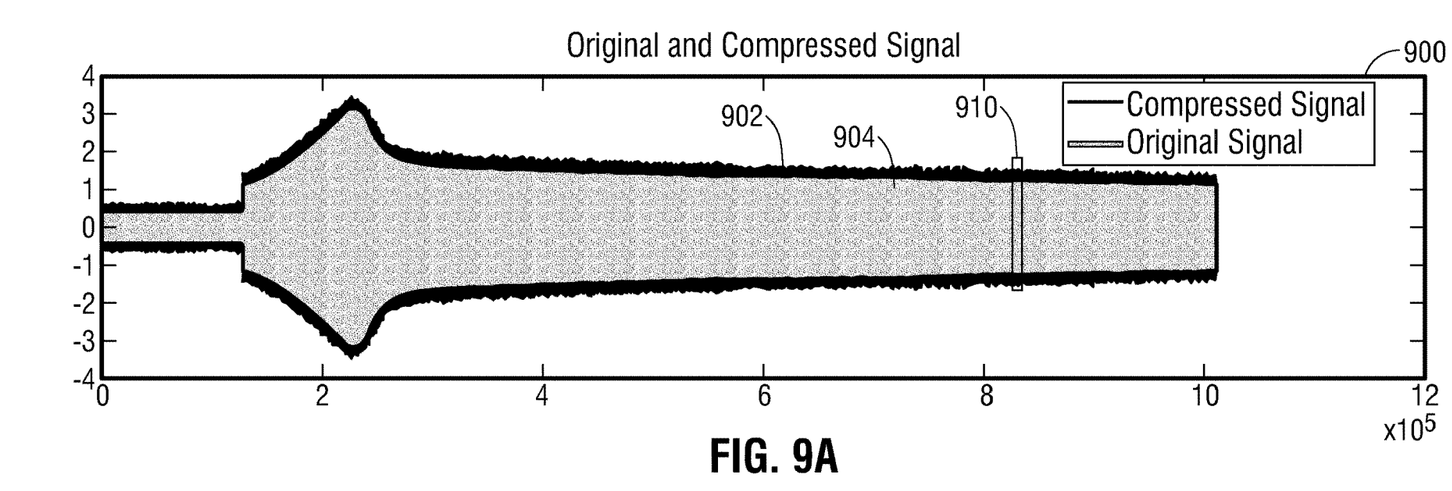
FIGS. 9A-9B are exemplary waveform plots illustrating the efficacy of the spectral reduction process according to embodiments of the present disclosure.
Figure 9B:
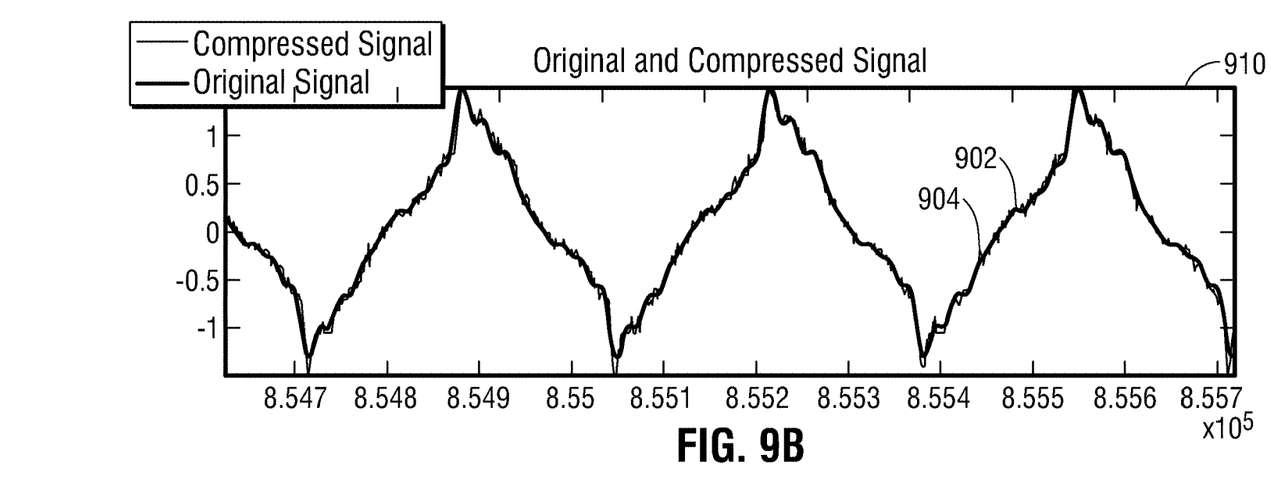

FIG. 9A shows a plot 900 demonstrating the effectiveness of the spectral reduction discussed herein applied to a line current signal 902. The original signal is indicated at 902 and the spectrally reduced signal (or reconstructed version thereof) is indicated at 904. As can be seen, the spectrally reduced signal 904 has a shape that is nearly identical to that of the original signal 902. The accuracy of the reconstruction can more clearly be seen in FIG. 9B, which shows a close-up view of section 910 from FIG. 9A. In the figure, individual waveforms can be seen of the original signal 902 and the spectrally reduced signal 904. As the figure shows, the waveforms for the spectrally reduced signal 904 closely follow the waveforms for the original signal 902 except for sharp peaks and valleys along the waveforms, which correspond to the high-frequency coefficients that were discarded.

In the preceding, reference is made to various embodiments. However, the scope of the present disclosure is not limited to the specific described embodiments. Instead, any combination of the described features and elements, whether related to different embodiments or not, is contemplated to implement and practice contemplated embodiments. Furthermore, although embodiments may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

The various embodiments disclosed herein may be implemented as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to as a "circuit," "module" or "system." Furthermore, aspects may take the form of a computer program product embodied in one or more computer-readable medium(s) having computer-readable program code embodied thereon.

Any combination of one or more computer-readable medium(s) may be utilized. The computer-readable medium may be a non-transitory computer-readable medium. A non-transitory computer-readable medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer-readable medium can include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages. Moreover, such computer program code can execute using a single computer system or by multiple computer systems communicating with one another (e.g., using a private area network (PAN), local area network (LAN), wide area network (WAN), the Internet, etc.). While various features in the preceding are described with reference to flowchart illustrations and/or block diagrams, a person of ordinary skill in the art will understand that each block of the flowchart illustrations and/or block diagrams, as well as combinations of blocks in the flowchart illustrations and/or block diagrams, can be implemented by computer logic (e.g., computer program instructions, hardware logic, a combination of the two, etc.). Generally, computer program instructions may be provided to a processor(s) of a general-purpose computer, special-purpose computer, or other programmable data processing apparatus. Moreover, the execution of such computer program instructions using the processor(s) produces a machine that can carry out a function(s) or act(s) specified in the flowchart and/or block diagram block or blocks.

The flowchart and block diagrams in the Figures illustrate the architecture, functionality and/or operation of possible implementations of various embodiments of the present disclosure. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is to be understood that the above description is intended to be illustrative, and not restrictive. Many other implementation examples are apparent upon reading and understanding the above description. Although the disclosure describes specific examples, it is recognized that the systems and methods of the disclosure are not limited to the examples described herein, but may be practiced with modifications within the scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

I claim:

1. A method of communicating high-resolution information from a circuit interrupt device to an external system, comprising:
    receiving a plurality of data sequences at a controller of the circuit interrupt device, each data sequence containing a set of data points corresponding to a waveform of line current flowing through the circuit interrupt device;
    performing spectral reduction on the plurality of data sequences using a finite series transform at the controller; and
    transmitting a spectrally reduced version of the plurality of data sequences to the external system.

2. The method of claim 1, wherein performing spectral reduction on the plurality of data sequences comprises:
    performing a first transform using the finite series transform on each data sequence in the plurality of data sequences at the controller to produce a plurality of waveform vectors, each waveform vector corresponding to a respective data sequence and containing a set of first spectral coefficients, each coefficient in the set of first spectral coefficients corresponding a data point in the respective data sequence; and
    reducing each waveform vector in the plurality of waveform vectors at the controller to produce a plurality of spectrally significant waveform vectors, each spectrally significant waveform vector corresponding to a respective waveform vector and containing only spectrally significant first spectral coefficients from the respective waveform vector.

3. The method of claim 2, wherein performing spectral reduction on the plurality of data sequences further comprises:
performing a second transform using the finite series transform on each spectrally significant waveform vector in the plurality of spectrally significant waveform vectors at the controller to produce a plurality of packet vectors, each packet vector containing a set of second spectral coefficients, each coefficient in the set of second spectral coefficients corresponding to a spectrally significant first spectral coefficient from a different spectrally significant waveform vector in the plurality of spectrally significant waveform vectors; and
reducing each packet vector in the plurality of packet vectors at the controller to produce a plurality of spectrally significant packet vectors, each spectrally significant packet vector corresponding to a respective packet vector and containing only spectrally significant second spectral coefficients from the respective packet vector.

4. The method of claim 2, wherein reducing each waveform vector in the plurality of waveform vectors at the controller to produce a plurality of spectrally significant waveform vectors comprises determining an optimal number of spectrally significant first spectral coefficients from the set of first spectral coefficients in each waveform vector.

5. The method of claim 3, wherein reducing each packet vector in the plurality of packet vectors at the controller to produce a plurality of spectrally significant packet vectors comprises determining an optimal number of spectrally significant second spectral coefficients from the set of second spectral coefficients in a packet vector.

6. The method of claim 4, wherein determining an optimal number of spectrally significant waveform vectors at the controller comprises determining whether a spectral ratio comprising a Euclidean distance for the optimal number of spectrally significant first spectral coefficients over a Euclidean distance for the set of first spectral coefficients in each waveform vector satisfies a Quality of Service (QoS) requirements.

7. The method of claim 5, wherein determining an optimal number of spectrally significant second spectral coefficients comprises determining whether a spectral ratio comprising a Euclidean distance for the optimal number of spectrally significant second spectral coefficients over a Euclidean distance for the set of second spectral coefficients in each waveform vectors satisfies a Quality of Service (QoS) requirements, the spectral ratio.

8. The method of claim 3, further comprising inserting the plurality of spectrally significant packet vectors into a data packet.

9. The method of claim 1, wherein the finite series transform is a Discrete Cosine Transform.

10. The method of claim 1, wherein transmitting the plurality of data sequences comprises transmitting over a wireless connection.

11. A circuit interrupt device, comprising:
a controller programmed to detect a fault condition in a branch circuit connected to the circuit interrupt device; and
a trip unit coupled to communicate with the controller and operable to shut off current flow through the circuit interrupt device in response to receiving a trip signal from the controller;

wherein the controller is further programmed to:
receive a plurality of data sequences, each data sequence containing a set of data points corresponding to a waveform of line current flowing through the circuit interrupt device;
perform spectral reduction on the plurality of data sequences using a finite series transform; and
transmit a spectrally reduced version of the plurality of data sequences to an external system.

12. The circuit interrupt device of claim 11, wherein the controller is further programmed to:
perform a first transform using the finite series transform on each data sequence in the plurality of data sequences at the controller to produce a plurality of waveform vectors, each waveform vector corresponding to a respective data sequence and containing a set of first spectral coefficients, each coefficient in the set of first spectral coefficients corresponding a data point in the respective data sequence; and
reduce each waveform vector in the plurality of waveform vectors at the controller to produce a plurality of spectrally significant waveform vectors, each spectrally significant waveform vector corresponding to a respective waveform vector and containing only spectrally significant first spectral coefficients from the respective waveform vector.

13. The circuit interrupt device of claim 12, wherein the controller is further programmed to:
perform a second transform using the finite series transform on each spectrally significant waveform vector in the plurality of spectrally significant waveform vectors at the controller to produce a plurality of packet vectors, each packet vector containing a set of second spectral coefficients, each coefficient in the set of second spectral coefficients corresponding to a spectrally significant first spectral coefficient from a different spectrally significant waveform vector in the plurality of spectrally significant waveform vectors; and
reduce each packet vector in the plurality of packet vectors at the controller to produce a plurality of spectrally significant packet vectors, each spectrally significant packet vector corresponding to a respective packet vector and containing only spectrally significant second spectral coefficients from the respective packet vector.

14. The circuit interrupt device of claim 12, wherein the controller is further programmed to reduce each waveform vector in the plurality of waveform vectors to produce a plurality of spectrally significant waveform vectors by determining an optimal number of spectrally significant first spectral coefficients from the set of first spectral coefficients in each waveform vector.

15. The circuit interrupt device of claim 13, wherein the controller is further programmed to reduce each packet vector in the plurality of packet vectors to produce a plurality of spectrally significant packet vectors by determining an optimal number of spectrally significant second spectral coefficients from the set of second spectral coefficients in a packet vector.

16. The circuit interrupt device of claim 14, wherein the controller is further programmed to determine an optimal number of spectrally significant waveform vectors by determining whether a spectral ratio comprising a Euclidean distance for the optimal number of spectrally significant first spectral coefficients over a Euclidean distance for the set of first spectral coefficients in each waveform vector satisfies a Quality of Service (QoS) requirements.

17. The circuit interrupt device of claim 15, wherein the controller is further programmed to determine an optimal number of spectrally significant second spectral coefficients by determining whether a spectral ratio comprising a Euclidean distance for the optimal number of spectrally significant second spectral coefficients over a Euclidean distance for the set of second spectral coefficients in each waveform vector satisfies a Quality of Service (QoS) requirements.

18. The circuit interrupt device of claim 13, wherein the controller is further programmed to insert the plurality of spectrally significant packet vectors in a data packet.

19. The circuit interrupt device of claim 11, wherein the finite series transform is a Discrete Cosine Transform.

20. A non-transitory computer-readable medium containing program logic that, when executed by operation of one or more computer processors, performs an operation comprising:
   receiving a plurality of data sequences at a controller of a circuit interrupt device, each data sequence containing a set of data points corresponding to a waveform of line current flowing through the circuit interrupt device;
   performing spectral reduction on the plurality of data sequences using a finite series transform at the controller; and
   transmitting a spectrally reduced version of the plurality of data sequences to an external system.

* * * * *